(12) United States Patent
Ogura

(10) Patent No.: US 7,817,611 B2
(45) Date of Patent: Oct. 19, 2010

(54) WIRELESS LOCAL AREA NETWORK SYSTEM

(75) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 774 days.

(21) Appl. No.: 11/730,537

(22) Filed: Apr. 4, 2007

(65) Prior Publication Data

US 2008/0049695 A1 Feb. 28, 2008

(30) Foreign Application Priority Data

Apr. 5, 2006 (JP) .............................. 2006-103992

(51) Int. Cl.
*H04W 4/00* (2009.01)
(52) U.S. Cl. ..................................... 370/338
(58) Field of Classification Search ........................ None
See application file for complete search history.

(56) References Cited

U.S. PATENT DOCUMENTS

| | | | |
|---|---|---|---|
| 7,050,396 B1 * | 5/2006 | Cohen et al. ................. | 370/235 |
| 7,366,168 B2 * | 4/2008 | Hughes et al. ............... | 370/389 |
| 2005/0141480 A1 | 6/2005 | Jin et al. | |
| 2008/0056278 A1 * | 3/2008 | Kadambi et al. ........ | 370/395.53 |
| 2008/0130637 A1 * | 6/2008 | Kant et al. ................... | 370/389 |
| 2008/0165740 A1 * | 7/2008 | Bachmann et al. .......... | 370/332 |

FOREIGN PATENT DOCUMENTS

| | | |
|---|---|---|
| JP | 2001-237831 | 8/2001 |
| JP | 2004-128603 | 4/2004 |
| JP | 2004-186753 | 7/2004 |
| JP | 2004-236030 | 8/2004 |
| JP | 2005-510131 | 4/2005 |
| JP | 2005-529522 | 9/2005 |

OTHER PUBLICATIONS

3GPP TR 23.836 V.1.0.0 (Nov. 2005) 3rd Generation Partnership Project; Technical Specification Group Services and System Aspects; Quality of Service (QoS) and policy aspects of 3GPP-Wireless Local Area Network (WLAN) interworking (Release 7).
"Collaborative QoS Architecture between DiffServ and. 802.11e Wireless LAN", Seyong Park, Kyungtae Kim, DC Kim, Sunghyun Choi, Sangjin Hong, Vehicular Technology Conference, 2003. VTC 2003-Spring. The 57th IEEE Semiannual, vol. 2, pp. 945-949, Apr. 25, 2003.
Chinese Office Action dated May 11, 2010, with English translation.

* cited by examiner

*Primary Examiner*—Ajit Patel
(74) *Attorney, Agent, or Firm*—McGinn IP Law Group, PLLC

(57) ABSTRACT

A mapping table holds correspondence relation between quality of service information of wired sections and quality of service information of wireless sections. A quality of service information converter, upon receiving encapsulated packets directed from a mobile communication network to a wireless local area network terminal, acquires quality of service information of wired sections that has been conferred to the packets, and finds quality of service information of wireless sections that corresponds to the quality of service information of wired sections in the mapping table. The quality of service information converter then uses this quality of service information of wireless sections to wirelessly transmit the encapsulated packets to a wireless local area network terminal.

16 Claims, 19 Drawing Sheets

Fig. 2

| 3GPP QoS Information | | Diffserv PHB | DSCP | QoS Requirement on GRX | | | | Service Example |
|---|---|---|---|---|---|---|---|---|
| Traffic Class | THP | | | Max Delay | Max Jitter | Packet Loss | SDU Error Ratio | |
| Conversational | N/A | EF | 101110 | 20ms | 5ms | 0.5% | $10^{-6}$ | VoIP, Video Conferencing |
| Streaming | N/A | AF4$_1$ | 100010 | 40ms | 5ms | 0.5% | $10^{-6}$ | Audio/Video Streaming |
| Interactive | 1 | AF3$_1$ | 011010 | 250ms | N/A | 0.1% | $10^{-8}$ | Transactional Services |
| | 2 | AF2$_1$ | 010010 | 300ms | N/A | 0.1% | $10^{-8}$ | Web Browsing |
| | 3 | AF1$_1$ | 001010 | 350ms | N/A | 0.1% | $10^{-8}$ | Telnet |
| Background | N/A | BE | 000000 | 400ms | N/A | 0.1% | $10^{-8}$ | E-mail Download |

Fig. 3

| Access Category | 802.1d Tags |
|---|---|
| WMM Voice Priority | 7,6 |
| WMM Video Priority | 5,4 |
| WMM Best Effort Priority | 0,3 |
| WMM Background Priority | 2,1 |

Fig. 8

| 3GPP QoS Information | | Diffserv PHB | DSCP |
|---|---|---|---|
| Traffic Class | THP | | |
| Conversational | N/A | EF | 101110 |
| Streaming | N/A | $AF4_1$ | 100010 |
| Interactive | 1 | $AF3_1$ | 011010 |
|  | 2 | $AF2_1$ | 010010 |
|  | 3 | $AF1_1$ | 001010 |
| Background | N/A | BE | 000000 |

Fig. 9

| Diffserv PHB | DSCP | WLAN Access Category |
|---|---|---|
| EF | 101110 | VOICE |
| $AF4_1$ | 100010 | VIDEO |
| $AF3_1$ | 011010 | Best Effort |
| $AF2_1$ | 010010 | |
| $AF1_1$ | 001010 | |
| BE | 000000 | Background |

Fig. 13

| Diffserv PHB | DSCP | WLAN Access Category |
|---|---|---|
| EF | 101110 | Best Effort |
| AF4$_1$ | 100010 | |
| AF3$_1$ | 011010 | |
| AF2$_1$ | 010010 | |
| AF1$_1$ | 001010 | |
| BE | 000000 | Background |

Fig. 14A

| Diffserv PHB | DSCP | WLAN Access Category |
|---|---|---|
| EF | 101110 | VOICE |
| AF4$_1$ | 100010 | |
| AF3$_1$ | 011010 | Best Effort |
| AF2$_1$ | 010010 | |
| AF1$_1$ | 001010 | |
| BE | 000000 | |

Fig. 14B

| Diffserv PHB | DSCP | WLAN Access Category |
|---|---|---|
| EF | 101110 | |
| AF4$_1$ | 100010 | |
| AF3$_1$ | 011010 | Best Effort |
| AF2$_1$ | 010010 | |
| AF1$_1$ | 001010 | |
| BE | 000000 | Background |

| Diffserv PHB | DSCP | 802.1d TAG |
|---|---|---|
| EF | 101110 | 7 |
|  |  | 6 |
| $AF4_1$ | 100010 | 5 |
| $AF3_1$ | 011010 | 3 |
| $AF2_1$ | 010010 |  |
| $AF1_1$ | 001010 |  |
| BE | 000000 |  |

Fig. 21

| Diffserv PHB | DSCP | 802.1d TAG |
|---|---|---|
| EF | 101110 | 3 |
| AF4$_1$ | 100010 | |
| AF3$_1$ | 011010 | |
| AF2$_1$ | 010010 | 0 |
| AF1$_1$ | 001010 | |
| BE | 000000 | 2 |
| | | 1 |

Fig. 22A

| Diffserv PHB | DSCP | 802.1d TAG |
|---|---|---|
| EF | 101110 | 7 |
|  |  | 6 |
| $AF4_1$ | 100010 | 5 |
| $AF3_1$ | 011010 | 3 |
| $AF2_1$ | 010010 |  |
| $AF1_1$ | 001010 |  |
| BE | 000000 |  |

Fig. 22B

| Diffserv PHB | DSCP | 802.1d TAG |
|---|---|---|
| EF | 101110 | 3 |
| $AF4_1$ | 100010 |  |
| $AF3_1$ | 011010 |  |
| $AF2_1$ | 010010 |  |
| $AF1_1$ | 001010 |  |
| BE | 000000 | 2 |
|  |  | 1 |

WIRELESS LOCAL AREA NETWORK SYSTEM

This application is based upon and claims the benefit of priority from Japanese Patent Application No. 2006-103992 filed on Apr. 5, 2006, the content of which is incorporated by reference.

BACKGROUND OF THE INVENTION

1. Field of the Invention

The present invention relates to the interworking of a WLAN network and a 3GPP network, and more particularly to QoS control in the interworking of a wireless local area and a 3GPP network.

2. Description of the Related Art

Progress is currently under way in the 3GPP (Third Generation Partnership Project) toward the standardization of specifications for connecting a 3GPP network and a WLAN (Wireless Local Area Network).

When connecting and coordinating the operation of a WLAN network and 3GPP network, appropriate QoS (Quality of Service) control is necessary for providing the user with a service that maintains the desired quality. The result of investigation by the 3GPP into QoS when linking a 3GPP network and a WLAN network is reflected in 3GPP TR 23.836 v.1.0.0 (2005-11): "Third Generation Partnership Project: Technical Specification Group Services and System Aspects: Quality of Service (QoS) and policy aspects of 3GPP-Wireless Local Area Network (WLAN) interworking (Release 7) (hereinbelow referred to as "3GPP TR23.836 v. 1.0.0").

FIG. 1 shows the configuration of QoS when interworking a 3GPP network and a WLAN network. This configuration is disclosed in FIG. 5.2 of 3GPP TR23.836 v. 1.0.0.

Referring to FIG. 1, when end-to-end service is offered between a WLAN terminal (WLAN UE) and an outside terminal (TE) by way of a 3GPP network, QoS control is carried out in each of bearer (3GPP IP Access Bearer Service) 91 that is established between WLAN UE and a PDG (Packet Data Gateway) and bearer (WLAN Bearer Service) 92 that is established between WLAN UE and WLAN AN (Access Network). The bearer established between WLAN UE and the PDG is hereinbelow referred to as a "3GPP bearer." The bearer established between WLAN UE and WLAN AN is hereinbelow referred to as a "WLAN bearer."

It is applied in a 3GPP network that QoS by means of 3GPP traffic classes. QoS according to the IEEE 802.11e standards are applied in the wireless sections of a WLAN network. The settings content and method differ between a system in which QoS is realized by 3GPP traffic classes and a system in which QoS is realized by the IEEE 802.113 standard.

In addition, as the interworking of a 3GPP network and WLAN network, a method has also been prescribed for establishing an IPSec (IP Security) tunnel between the 3GPP network and WLAN terminals. This IPSec tunnel corresponds to 3GPP bearer 91 shown in FIG. 1. Considered from the standpoint of the 3GPP network, a WLAN network is positioned as a transfer path for merely transferring IP packets, and as a result, the 3GPP network takes into account neither the state nor the configuration of the WLAN network in QoS control.

FIG. 2 is a table showing the mapping of 3GPP traffic classes and DSCP (Diffserv Code Point) values conferred to headers of IP packets. This table is disclosed as Table A3 in Annex A of 3GPP TR23.836 v.1.0.0. It is conceivable that the PDG shown in FIG. 1, when encapsulating IP packets to be transmitted to WLAN UE by an IPSec tunnel, determines DSCP values that are conferred to IP headers by means of the mapping table of FIG. 2.

As described above, QoS according to the IEEE 802.11e standard is applied in wireless sections of a WLAN network. The IEEE 802.11e standard prescribes four access categories as packet transmission queues to realize priority control of wireless sections, and further prescribes mapping between access classes and 802.1d tags.

FIG. 3 is a table showing the mapping of access categories and 802.1d tags. This table is prescribed by IEEE 802.11e and is disclosed as Table A1 in Annex A of 3GPP TR 23.836 v.1.0.0. In WLAN AN shown in FIG. 1, the determination of access categories in accordance with the mapping table of FIG. 3 can be considered when transmitting IP packets to WLAN UE by WLAN bearer (WLAN Bearer Service).

However, the above-described art has problems as described below.

When interworking a 3GPP network and WLAN network, QoS control in the 3GPP network and QoS control in the WLAN network are each implemented independently.

When setting an IPSec tunnel, WLAN UE and PDG carry out a QoS negotiation and determine 3GPP traffic classes. At this time, the configuration and state of the WLAN network are not taken into account, as previously described. On the other hand, a WLAN network that only transfers IP packets of an IPSec tunnel does not consider the QoS negotiation results.

Uniform QoS values (access categories) such as "Best Effort" are therefore set for all users in the WLAN network, and QoS control is carried out based on these settings. Consequently, QoS control appropriate to actual services such as VoIP and streaming is not implemented, thereby raising the danger of drops in quality of service caused by delay or data loss.

It has therefore not been possible to implement appropriate QoS control in the wireless sections of the WLAN network when interworking a 3GPP network and WLAN network.

SUMMARY OF THE INVENTION

It is an object of the present invention to provide a system that enables appropriate QoS control when interworking a 3GPP network and wireless local area network.

To achieve the above-described object, the wireless local area network access point device of the present invention is an access point device of a wireless local area network that interworks with a mobile communication network and includes a mapping table and a QoS information converter.

The mapping table holds the correspondence between QoS information of wired sections and QoS information of wireless sections.

The QoS information converter, upon receiving encapsulated packets directed from the mobile communication network to a wireless local area network terminal, acquires the QoS information of wired sections that has been conferred to these packets, acquires the QoS information of wireless sections that corresponds to this QoS information of wired sections from the mapping table, and using this QoS information of wireless sections to wirelessly transmit the encapsulated packets to the wireless local area network terminal.

According to the present invention, a wireless local area network access point device, upon receiving downlink packets, acquires QoS information of wired sections from these packets, acquires the QoS information of wireless sections that corresponds to this QoS information of wired sections, and uses this QoS information of wireless sections to transmit wirelessly. As a result, the QoS control of a mobile communication network can be placed in association with the QoS control of a wireless local area network, and appropriate QoS control can be implemented in the wireless sections of a wireless local area network.

The above and other objects, features, and advantages of the present invention will become apparent from the following description with references to the accompanying drawings which illustrate examples of the present invention.

BRIEF DESCRIPTION OF THE DRAWINGS

FIG. 2 is a table showing the mapping of 3GPP traffic classes and DSCP values conferred to the headers of IP packets;

FIG. 3 is a table showing the mapping of access categories and 802.1d tags;

FIG. 8 shows a DSCP mapping table;

FIG. 9 shows an example of an access category mapping table in the first embodiment;

FIG. 13 shows an example of the control over an access category mapping table by policy control device 16 in the second embodiment;

FIG. 14A shows another example of the control over an access category mapping table by policy control device 16 in the second embodiment;

FIG. 14B shows another example of the control over an access category mapping table by policy control device 16 in the second embodiment;

FIG. 21 shows an example of the control over the 802.1d tag mapping table by the policy control device when a policy control device is added to the fourth embodiment;

FIG. 22A shows another example of the control over the 802.1d tag mapping table by a policy control device when a policy control device is added to the fourth embodiment; and FIG. 22B shows another example of the control over the 802.1d tag mapping table by a policy control device when a policy control device is added to the fourth embodiment.

DETAILED DESCRIPTION OF THE PREFERRED EMBODIMENTS

Explanation next regards details of embodiments for working the present invention with reference to the accompanying figures.

First Embodiment

Figure 1:
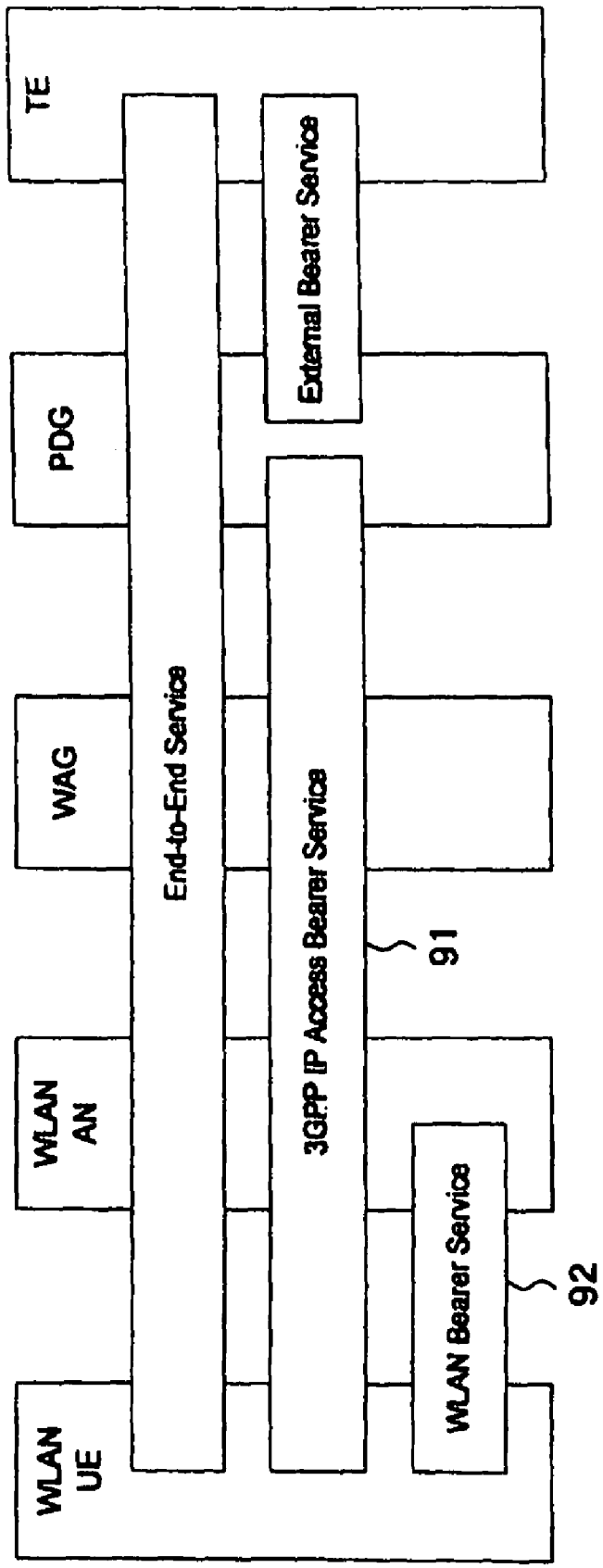
FIG. 1 shows the QoS configuration for a case of interworking a 3GPP network and a WLAN network.
Figure 4:
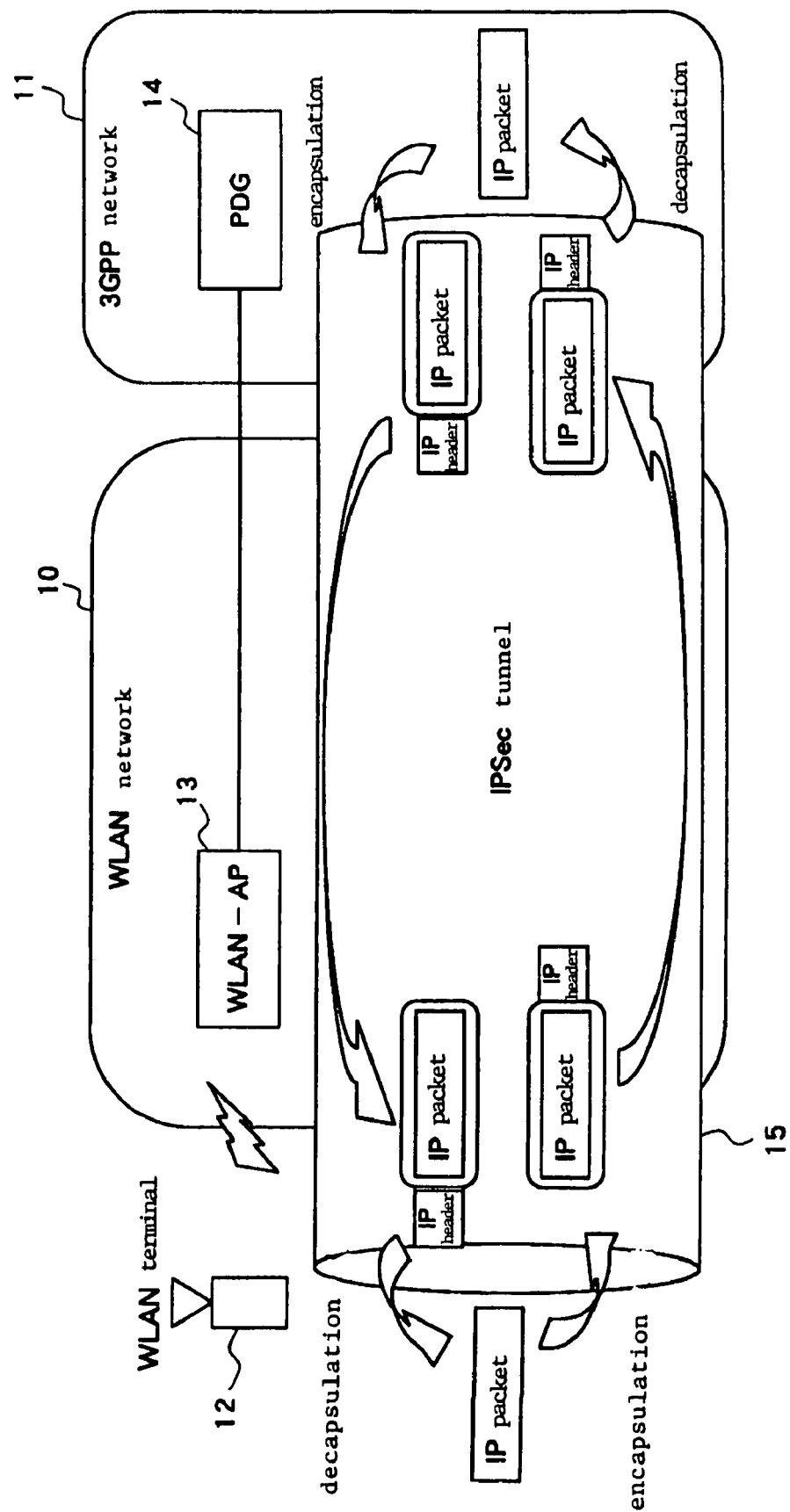
FIG. 4 is a block diagram showing the configuration of a communication system according to the first embodiment.

FIG. 4 is a block diagram showing the configuration of a communication system according to the first embodiment. Referring to FIG. 4, in the communication system of the present embodiment, WLAN network 10 and 3GPP network 11 are interconnected to enable interworking of WLAN network 10 and 3GPP network 11. By means of this interworking, WLAN terminal 12 can connect to 3GPP network 11 by way of WLAN network 10.

WLAN network 10 includes WLAN-AP (WLAN-Access Point) 13 that wirelessly connects to WLAN terminal 12, and may further include, for example, communication devices (not shown) such as routers in wired sections.

3GPP network 11 includes PDG (packet data gateway) 14 that is a gateway for connecting to a packet data network, and PDG 14 processes IP packets of WLAN terminal 12 in concert with WLAN 10. WLAN-AP 13 of WLAN network 10 and PDG 14 of 3GPP network 11 are connected to each other in order to enable interworking between WLAN network 10 and 3GPP network 11.

WLAN terminal 12 manages a DSCP mapping table for holding QoS information used in the transmission of IP packets. This DSCP mapping table records the correspondence of 3GPP traffic classes and DSCP values conferred to IP headers. DSCP values are control information used in Diffserv priority control, the priority of output and queuing being determined by these values.

WLAN terminal 12 establishes IPSec tunnel 15 with PDG 14, and, using SIP (Session Initiation Protocol) to carry out QoS negotiation, determines 3GPP traffic classes.

When transmitting IP packets by way of PDG 14, WLAN terminal 12 encapsulates these IP packets to transmit by IPSec tunnel 15. At this time, WLAN terminal 12 refers to the DSCP mapping table, acquires the DSCP values that correspond to the 3GPP traffic classes that have been determined, adds these DSCP values to the headers of the encapsulated IP packets, and transmits by IPSec tunnel 15.

Upon receiving IP packets that have been encapsulated from PDG 14, WLAN terminal 12 further decapsulates these IP packets to acquire the data. Decapsulation is the process of releasing the encapsulation of IP packets that have been encapsulated.

PDG 14 manages a DSCP mapping table that holds QoS information that is used in the transmission of IP packets. This DSCP mapping table is identical to the table held by WLAN terminal 12.

PDG 14 establishes IPSec tunnel 15 with WLAN terminal 12, and uses SIP to carry out QoS negotiation to determine 3GPP traffic classes.

When encapsulating IP packets for transmission to WLAN terminal 12, PDG 14 refers to the DSCP mapping table, acquires DSCP values that are to be set in the IP headers of IP encapsulation, and sets these DSCP values in the headers of encapsulated IP packets for transmission by the IPSec tunnel.

Upon receiving IP packets that have been encapsulated from WLAN terminal 12 by the IPSec tunnel, PDG 14 further decapsulates these IP packets.

Figure 5:
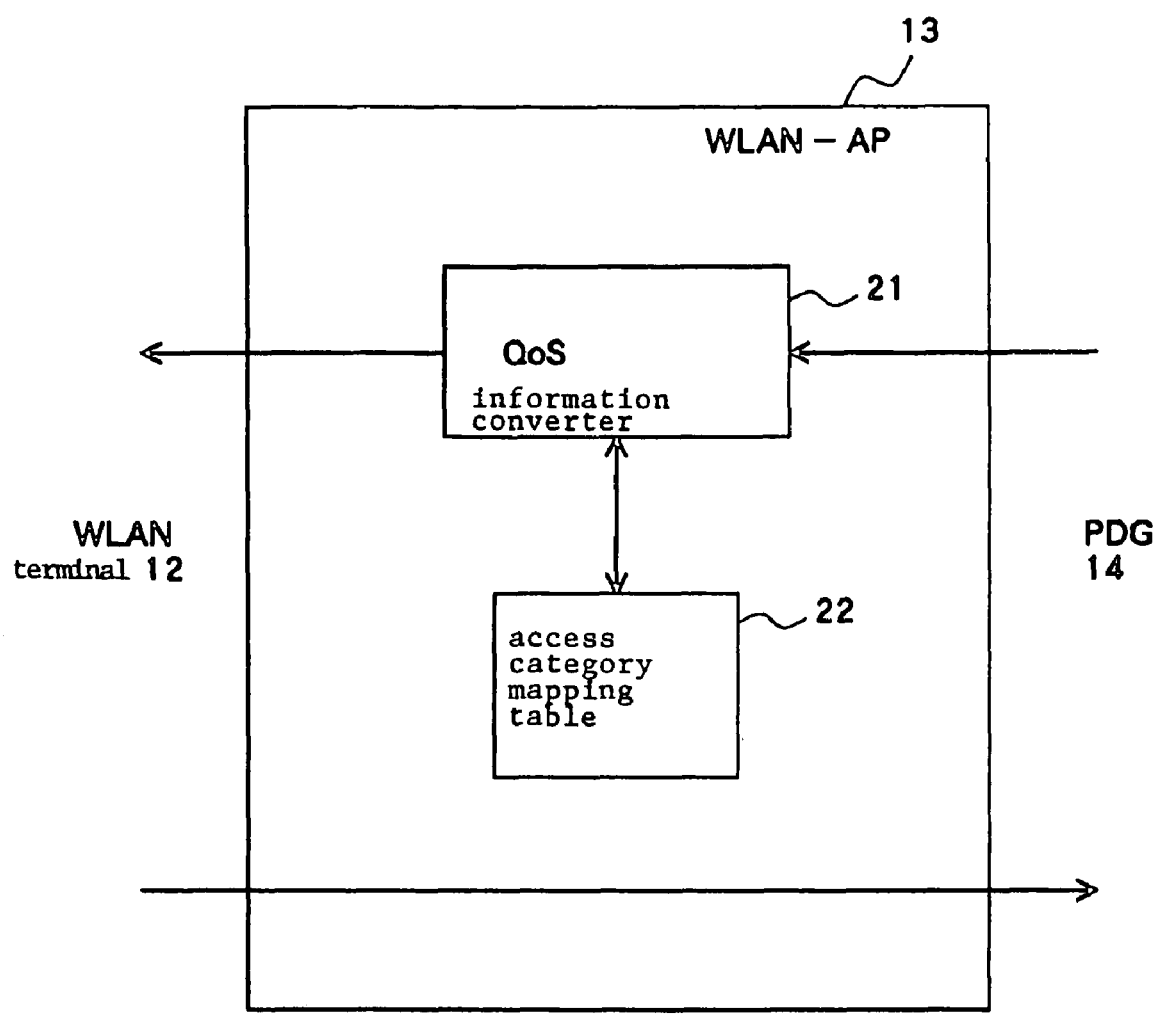
FIG. 5 is a block diagram showing the configuration of a WLAN-AP according to the first embodiment.

FIG. 5 is a block diagram showing the configuration of WLAN-AP according to the first embodiment. Referring to FIG. 5, WLAN-AP 13 includes QoS information converter 21 and access category mapping table 22.

Access category mapping table 22 records the correspondence between DSCP values, which are the QoS information conferred to the headers of encapsulated IP packets, and WLAN access categories, which is the QoS information of wireless sections of WLAN network 10.

Upon receiving encapsulated IP packets in the downlink direction, QoS information converter 21 acquires the DSCP values in the IP headers of these IP packets, and refers to the access category mapping table to find the WLAN access category, which is the QoS information for wireless sections. QoS information converter 21 then uses the WLAN access category that has been found to wirelessly transmit the IP packets to WLAN terminal 12.

Explanation next regards data communication of WLAN terminal 12 and PDG 14, this explanation being divided between the downlink direction and uplink direction.

Figure 6:
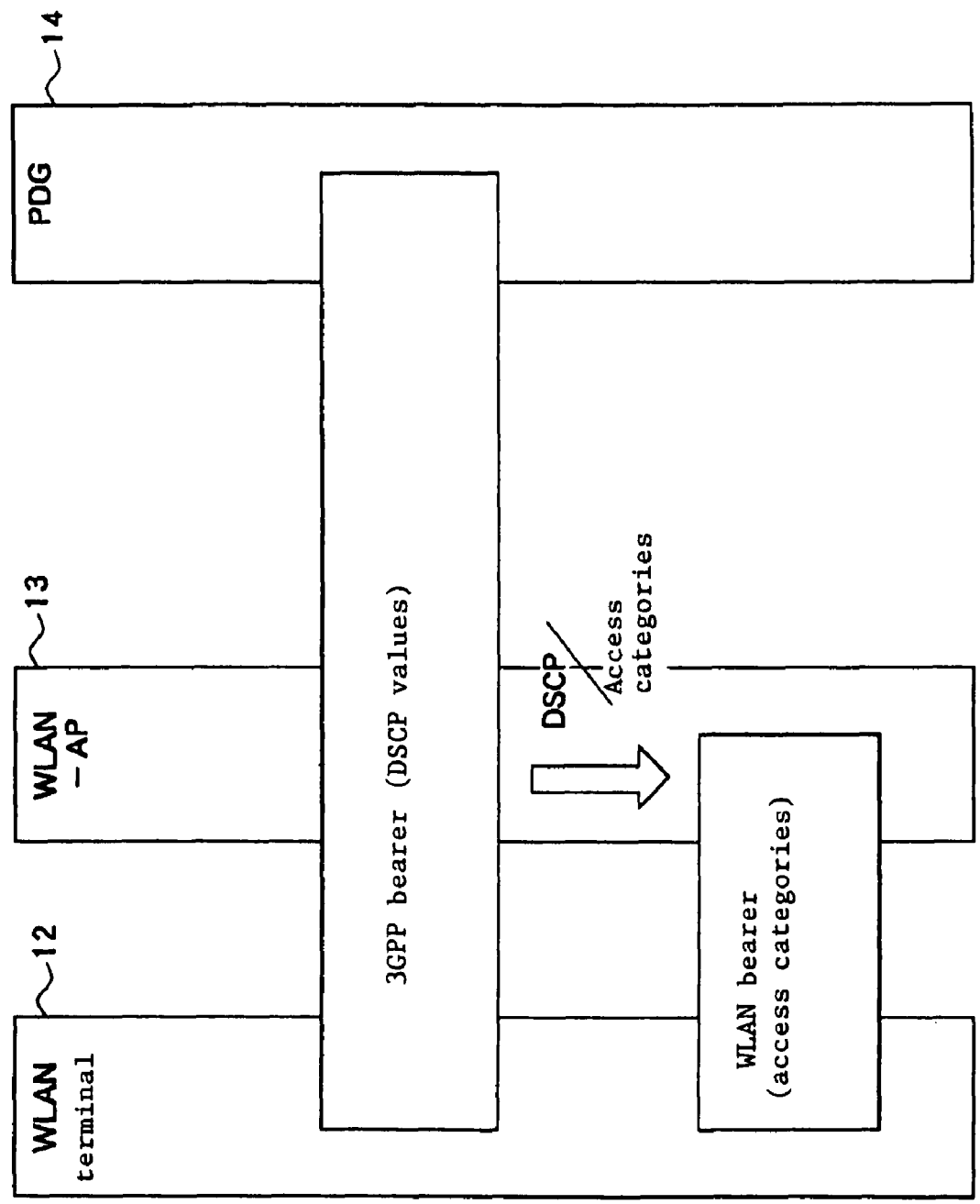
FIG. 6 shows the QoS configuration of a communication system according to the first embodiment.

FIG. 6 shows the QoS configuration of the communication system according to the first embodiment. As shown in FIG. 6, in the present embodiment, QoS control is carried out in the 3GPP bearer that is established between WLAN terminal 12 and PDG 14 and in the WLAN bearer that is established between WLAN terminal 12 and WLAN-AP 13.

Regarding downlink data communication, WLAN-AP 13 refers to the DSCP values conferred to the IP headers of IP packets that have been encapsulated by PDG 14 to determine the WLAN access category. Appropriate QoS control can be carried out in the wireless sections of the WLAN network by thus placing QoS control of the 3GPP bearer in association with the QoS control of the WLAN bearer.

Figure 7:
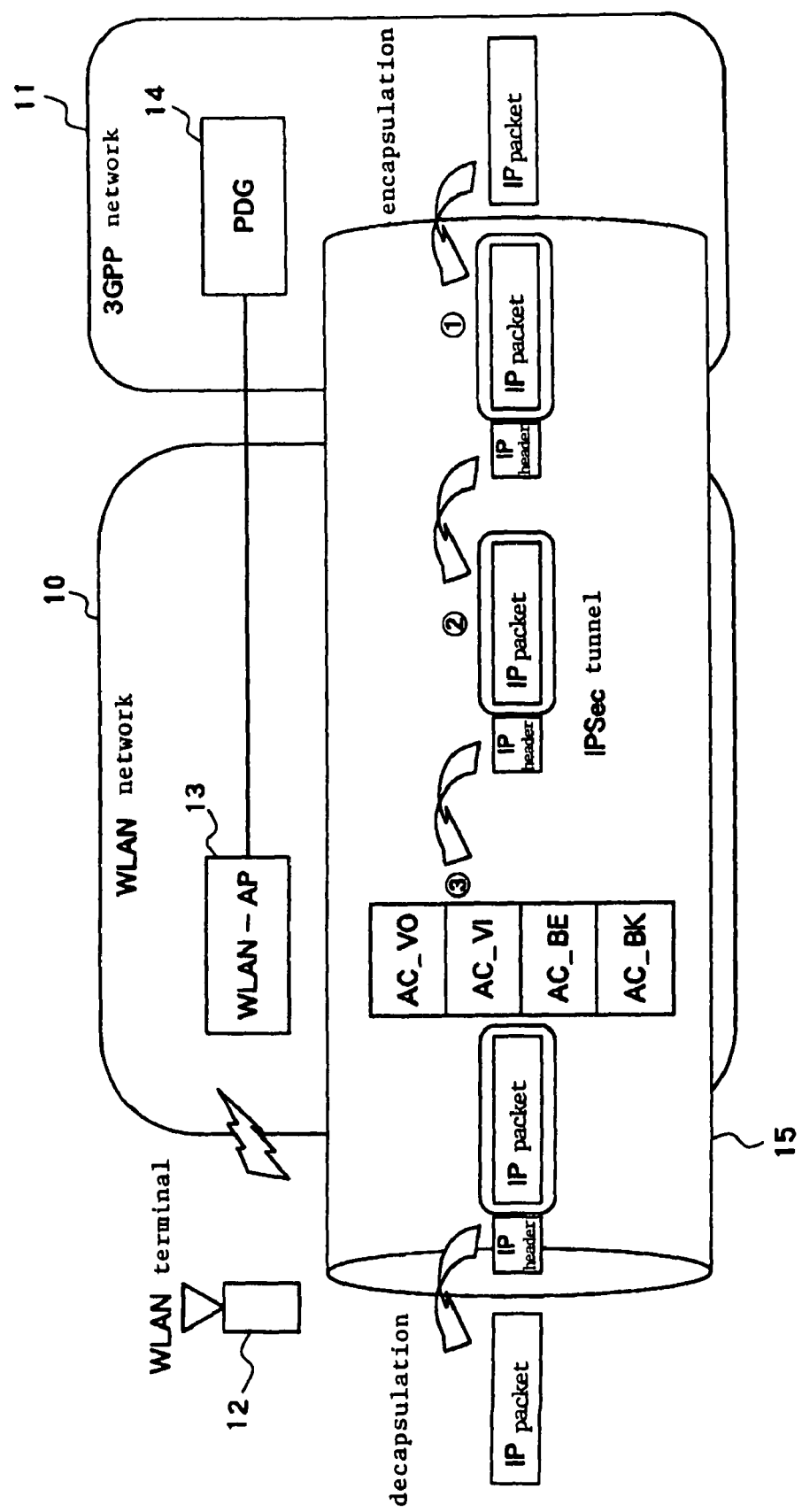
FIG. 7 is a view for explaining downlink data communication in a communication system according to the first embodiment.

FIG. 7 is a figure for explaining downlink data communication in a communication system according to the first embodiment. Referring to FIG. 7, in the communication system of the present embodiment, PDG 14 first encapsulates and transmits IP packets. DSCP values that correspond to 3GPP traffic classes that have been determined in advance by QoS negotiation are described in the IP-encapsulated IP headers. When determining these DSCP values, PDG 14 refers to the DSCP mapping table.

FIG. 8 shows the DSCP mapping table. Referring to FIG. 8, the correspondence of 3GPP traffic classes and DSCP values is shown. This table is the table disclosed as Table A3 of 3GPP TR 23.836 v.1.0.0. In other words, PDG 14 carries out operations prescribed in 3GPP TR23.836 v.1.0.0.

In wired sections of WLAN network 10, priority control is carried out based on the DSCP values described in the TOS fields in the IP headers of encapsulated IP packets.

Upon receiving encapsulated IP packets from PDG 14, WLAN-AP 13 acquires the WLAN access category, which is the QoS information of wireless sections, from the DSCP values that have been conferred to the headers of the IP packets.

When acquiring the WLAN access category, WLAN-AP 13 refers to the access category mapping table. FIG. 9 shows an example of the access category mapping table in the first embodiment. Referring to FIG. 9, the correspondence between DSCP values and WLAN access categories is shown.

In the IEEE 802.11e standards, four WLAN access categories are defined as shown in FIG. 9 as the packet transmission queues for carrying out priority control of wireless sections. The four access categories are:

Background (for background traffic: AC_BK), Best Effort (for best effort: AC_BE), VIDEO (for video transmission: AC_VI), and VOICE (for voice: AC_VO).

In priority control, a priority parameter is set in each access category. By implementing priority control that uses priority parameters in wireless sections, data of access categories having high priority are given more opportunities for transmission.

WLAN-AP 13 uses these WLAN access categories to transmit IP packets to WLAN terminal 12.

WLAN terminal 12 decapsulates the IP packets that have been received from WLAN-AP 13 to acquire the data.

Figure 10:
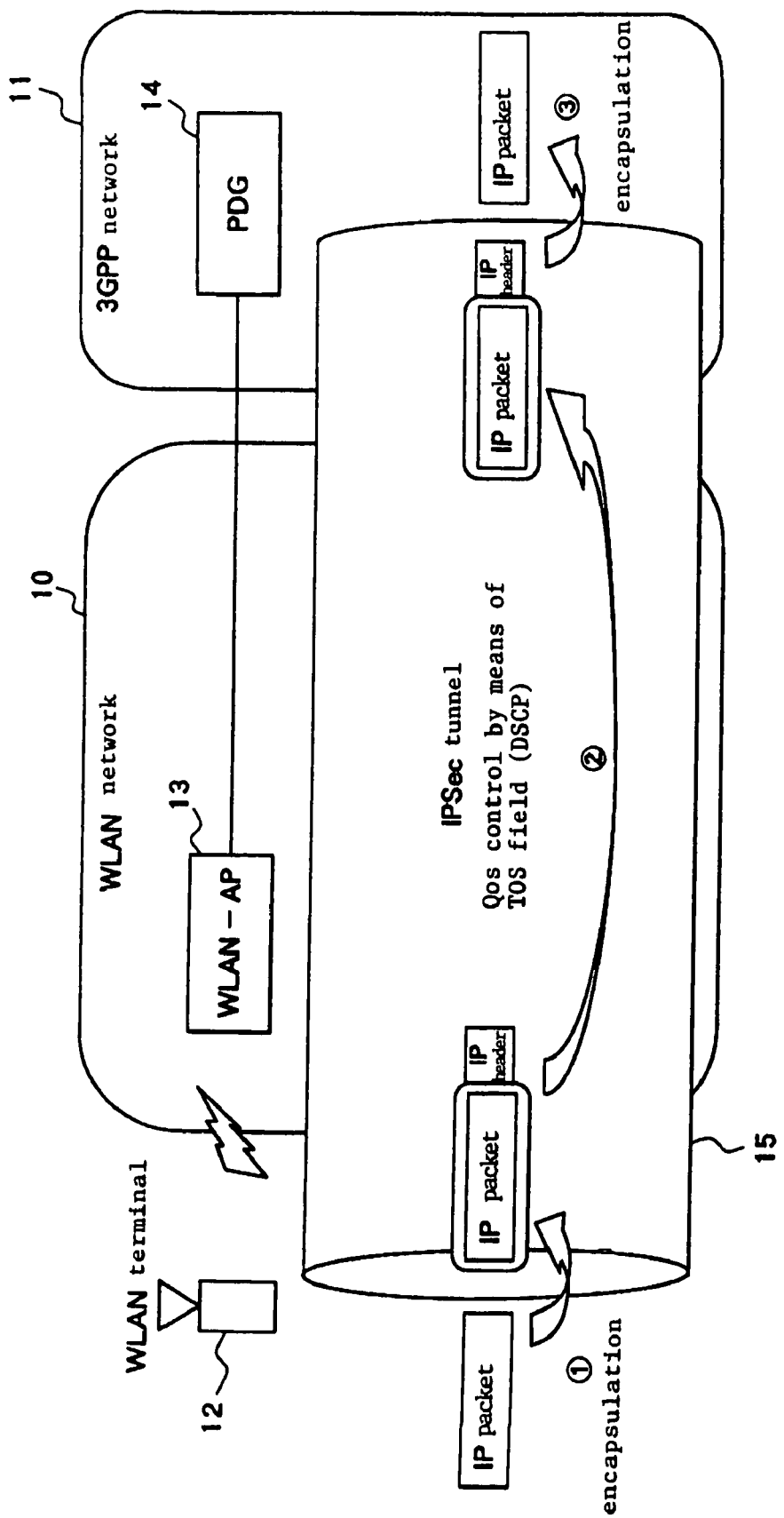
FIG. 10 is a view for explaining uplink data communication in a communication system according to the first embodiment.

FIG. 10 is a figure for explaining uplink data communication in a communication system according to the first embodiment. Referring to FIG. 10, in the communication system of this embodiment, WLAN terminal 12 first carries out IP encapsulation and then transmits to WLAN-AP 13 IP packets in which DSCP values that correspond to the 3GPP traffic classes that have been determined in advance by QoS negotiation are conferred to headers.

In wired sections of WLAN network 10, priority control is carried out based on the DSCP values noted in TOS fields in the IP headers of the encapsulated IP packets.

PDG 14, having received the encapsulated IP packets, decapsulates the IP packets to obtain the data.

In the IEEE 802.11e standard, QoS control of wireless sections is prescribed only for the downlink direction, and for the uplink direction, only priority control that uses TOS fields (DSCP) is carried out in the wired sections from WLAN-AP 13 to PDG 14.

Figure 11:
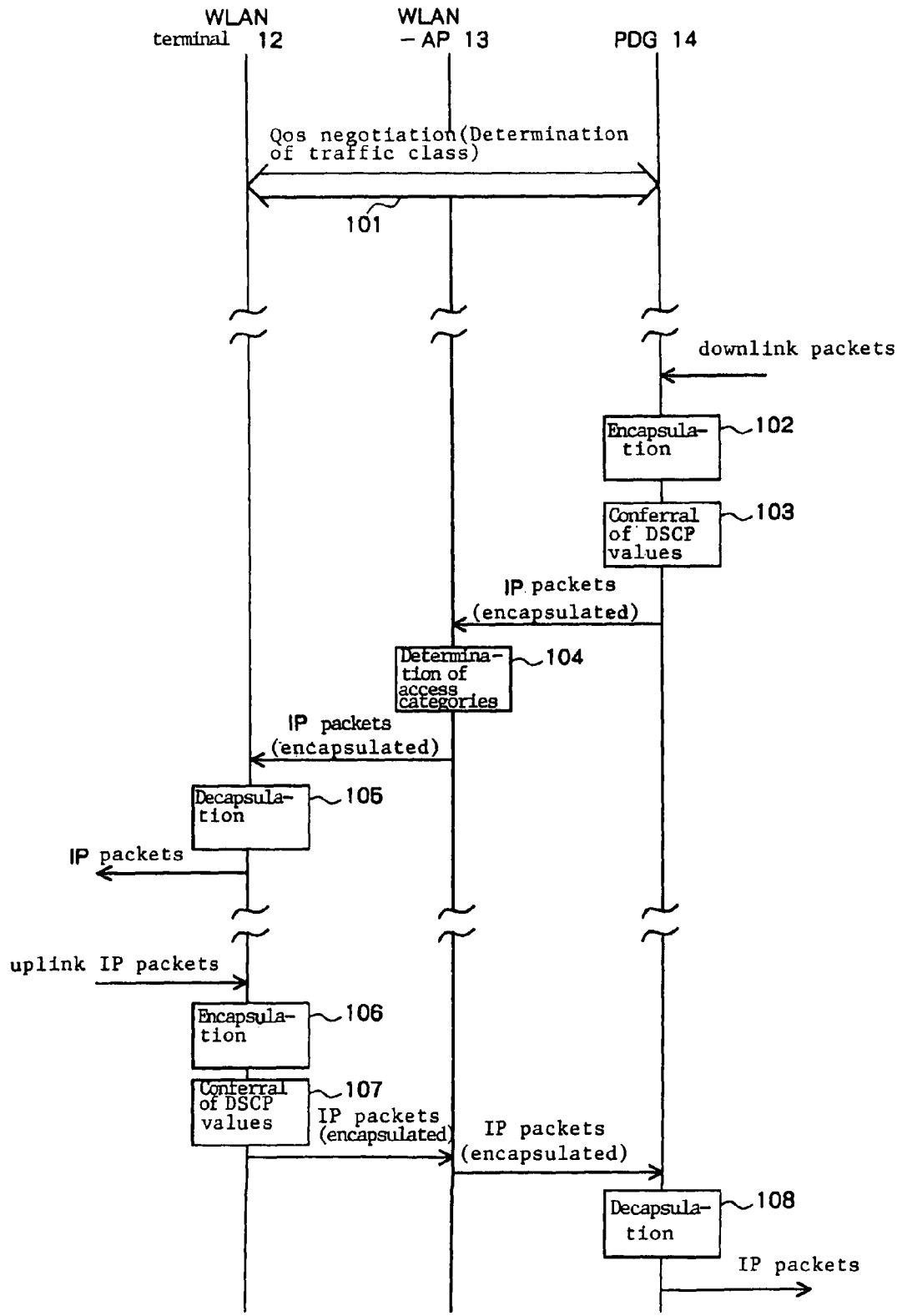
FIG. 11 is a sequence chart giving a schematic representation of the operation relating to the QoS of data communication in a communication system according to the first embodiment.

FIG. 11 is a sequence chart showing a schematic representation of operations relating to the QoS of data communication in a communication system according to the first embodiment. Referring to FIG. 11, WLAN terminal 12 and PDG 14 carry out QoS negotiation to determine the 3GPP traffic classes (Step 101).

In data communication in the downlink direction from PDG 14 to WLAN terminal 12, PDG 14 encapsulates downlink IP packets (Step 102). PDG 14 then acquires the DSCP values that correspond to the 3GPP traffic classes determined in Step 101 and confers these DSCP values to the headers of the encapsulated IP packets and transmits the IP packets to WLAN-AP 13 (Step 103).

Upon receiving the encapsulated IP packets, WLAN-AP 13 obtains the DSCP values from the headers of the IP packets and determines the WLAN access categories that correspond to these DSCP values (Step 104). WLAN-AP 13 then uses these WLAN access categories to wirelessly transmit the IP packets to WLAN terminal 12.

WLAN terminal 12, having received the encapsulated IP packets, decapsulates the IP packets to obtain the data (Step 105).

In data communication in the uplink direction from WLAN terminal 12 to PDG 14, on the other hand, WLAN terminal 12 encapsulates the uplink IP packets (Step 106) and further, confers DSCP values that correspond to the 3GPP traffic classes determined in QoS negotiation and transmits to WLAN-AP 13 (Step 107). WLAN-AP 13, having received the encapsulated IP packets, transmits the IP packets without alteration to PDG 14.

PDG 14, having received the encapsulated IP packets, decapsulates the IP packets to obtain the data (Step 108).

According to the present embodiment as described in the foregoing explanation, WLAN terminal 12 and PDG 14 in 3GPP network 11 transmit and receive IP packets with each other by converting 3GPP traffic classes that have been determined by QoS negotiation to DSCP values and then encapsulating the IP packets. WLAN-AP 13, upon receiving the downlink IP packets from PDG 14 to WLAN terminal 12, obtains the DSCP values from the headers and then converts the DSCP values to WLAN access categories that correspond to the DSCP values to wirelessly transmit the IP packets to WLAN terminal 12. The appropriate QoS control in wireless sections of the WLAN network is enabled by thus associating the QoS control of the 3GPP network with the QoS control of the WLAN network.

Second Embodiment

Figure 12:
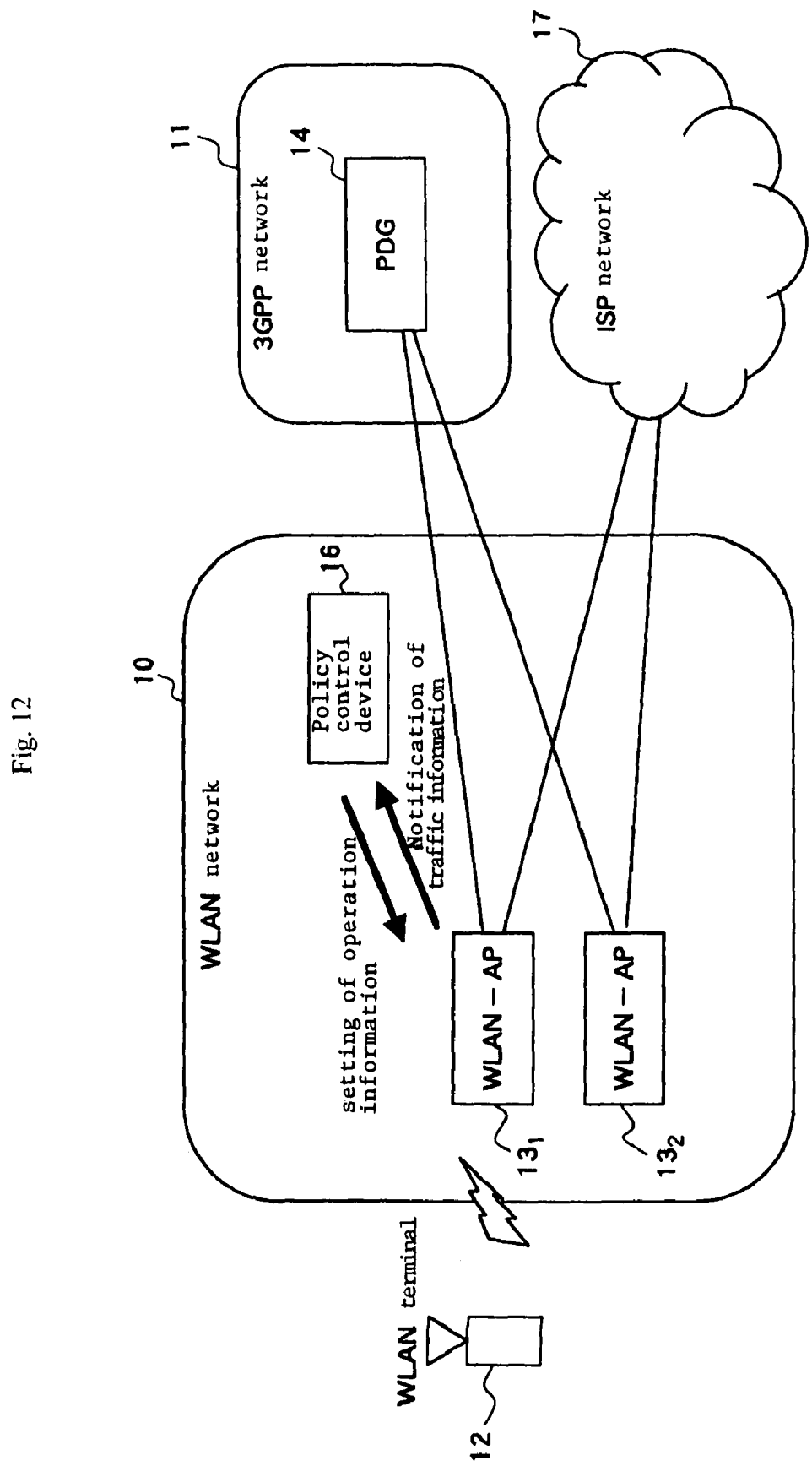
FIG. 12 is a block diagram showing the configuration of a communication system according to the second embodiment.

FIG. 12 is a block diagram showing the configuration of a communication system according to the second embodiment. Referring to FIG. 12, WLAN network 10 and 3GPP network 11 are interconnected in the communication system of the present embodiment as in the first embodiment.

As in the first embodiment, WLAN network 10 includes WLAN-AP 13$_1$ and 13$_2$ that are connected wirelessly to WLAN terminal 12, and may further include communication devices (not shown) such as routers in wired sections. In the present embodiment, WLAN network 10 further includes policy control device 16.

WLAN-AP 13$_1$ and 13$_2$ and the communication devices of wired sections refer to DSCP values of IP packets to carry out QoS control and traffic control. The operations for QoS control and traffic control in these WLAN-AP 13$_1$ and 13$_2$ and communication devices in wired sections can be altered by setting the parameters of operation information.

Policy control device 16 is a device for realizing the centralized control of operation information in WLAN network 10, and in QoS control, an access category mapping table is held for recording the correspondence of DSCP values and WLAN access categories.

In the first embodiment, a configuration was adopted in which each WLAN-AP 13 individually managed an access category mapping table, but in the second embodiment, policy control device 16 implements centralized control of an access category mapping table. Policy control device 16 further collects traffic information from WLAN-AP 13$_1$ and 13$_2$. Policy control device 16 then dynamically alters the operations of QoS control and traffic control based on the traffic information that has been collected from WLAN-AP 13$_1$ and 13$_2$ and the access category mapping table over which it exercises centralized control. Here, policy control device 16 instructs the parameter settings of QoS control and traffic control to WLAN-AP 13$_1$ and 13$_2$ and communication devices of wired sections.

Examples of traffic information that is collected include the number of WLAN terminals 12 that are under the jurisdiction of each WLAN-AP 13$_1$ and 13$_2$ and information indicating services (QoS values) that each WLAN-AP 13$_1$ and 13$_2$ provides to subordinate WLAN terminals 12.

Based on the number of WLAN terminals 12 that fall under the jurisdiction of each WLAN-AP 13$_1$ and 13$_2$, policy control device 16 determines the advisability of accepting new calls as a traffic control parameter. For example, in WLAN-AP 13 in which the number of subordinate WLAN terminals 12 exceeds a prescribed threshold value, the acceptance of new calls can be refused.

Policy control device 16 further ascertains the load state in wireless sections based on information indicating the services that each WLAN-AP 13$_1$ and 13$_2$ provides to subordinate WLAN terminals 12. Policy control device 16 then performs such operations as determining the QoS value that is applied to new calls based on this load state and changing the QoS values for existing calls.

Policy control device 16 may further collect these types of traffic information for each wired section of the WLAN network, i.e., for each VLAN. Alternatively, policy control device 16 may collect these types of traffic information for each wireless section of the WLAN network, i.e., for each virtual AP. Policy control device 16 may further take into account higher-layer networks such as ISP network 17 or 3GPP network 14 based on the traffic information for each VLAN or each virtual AP and implement parameter settings of QoS control and traffic control that differ for each higher-layer network.

WLAN-AP 13$_1$ and 13$_2$ of the present embodiment reflect the QoS information reported from policy control device 16 in their own access category mapping tables and implement QoS control based on this table.

WLAN-AP 13$_1$ and 13$_2$ and communication devices of wired sections of WLAN network 10 implement QoS control and traffic control in accordance with the parameter settings communicated from policy control device 16.

According to the present embodiment as described in the foregoing explanation, policy control device 16 collects traffic information from each WLAN-AP 13$_1$ and 13$_2$, and, based on this traffic information, dynamically alters QoS control and traffic control in each device in WLAN network 10, whereby appropriate QoS control can be realized in real time according to conditions at that time. In addition, the present embodiment enables QoS control that is appropriate for each higher-layer network.

Explanation next regards an example of dynamic control of an access category mapping table by means of policy control device 16 of the present embodiment.

FIG. 9 shows an example of an access category mapping table that is used in WLAN-AP 13$_1$ and 13$_2$, but policy control device 16 may also dynamically control the settings of this access category mapping table. In this case, policy control device 16 may control the access category mapping table based on traffic information that is acquired from WLAN-AP 13$_1$ and 13$_2$.

FIG. 13 shows an example of the control of the access category mapping table by means of policy control device 16 according to the second embodiment. If the higher-layer network is limited to a network realized by a single operator (for example, a 3GPP network), there is no need to take into account competition for resources among higher-layer networks in the QoS control by means of the access category mapping table.

For example, policy control device 16 may use the access category mapping table shown in FIG. 9 as a default, and may control the access category mapping table based on traffic information acquired from WLAN-AP 13$_1$ and 13$_2$. When policy control device 16 determines, based on traffic information, that the assignment of sufficient wireless bandwidth to VOICE and VIDEO is problematic, policy control device 16 may limit the QoS demand of VOICE and VIDEO from higher-layer networks.

When limiting the QoS demand of VOICE and VIDEO, policy control device 16 may rewrite the access category mapping table as shown in, for example, FIG. 13. In this way, VOICE and VIDEO are limited to the same priority as Best Effort.

FIG. 14A and FIG. 14B show other examples of the control over the access category mapping table by means of policy control device 16 in the second embodiment. In the case of a plurality of higher-layer networks realized by different operators, the competition for resources among the higher-layer networks can be taken into account in the QoS control by means of an access category mapping table.

For example, policy control device 16 may be enabled to set access category mapping tables that differ for each higher-layer network and then control each access category mapping table based on traffic information acquired from WLAN-AP $13_1$ and $13_2$. For example, the access category mapping table for a 3GPP network may be set as shown in FIG. 14A, and the access category mapping table for an ISP network may be set as shown in FIG. 14B.

Third Embodiment

Figure 15:
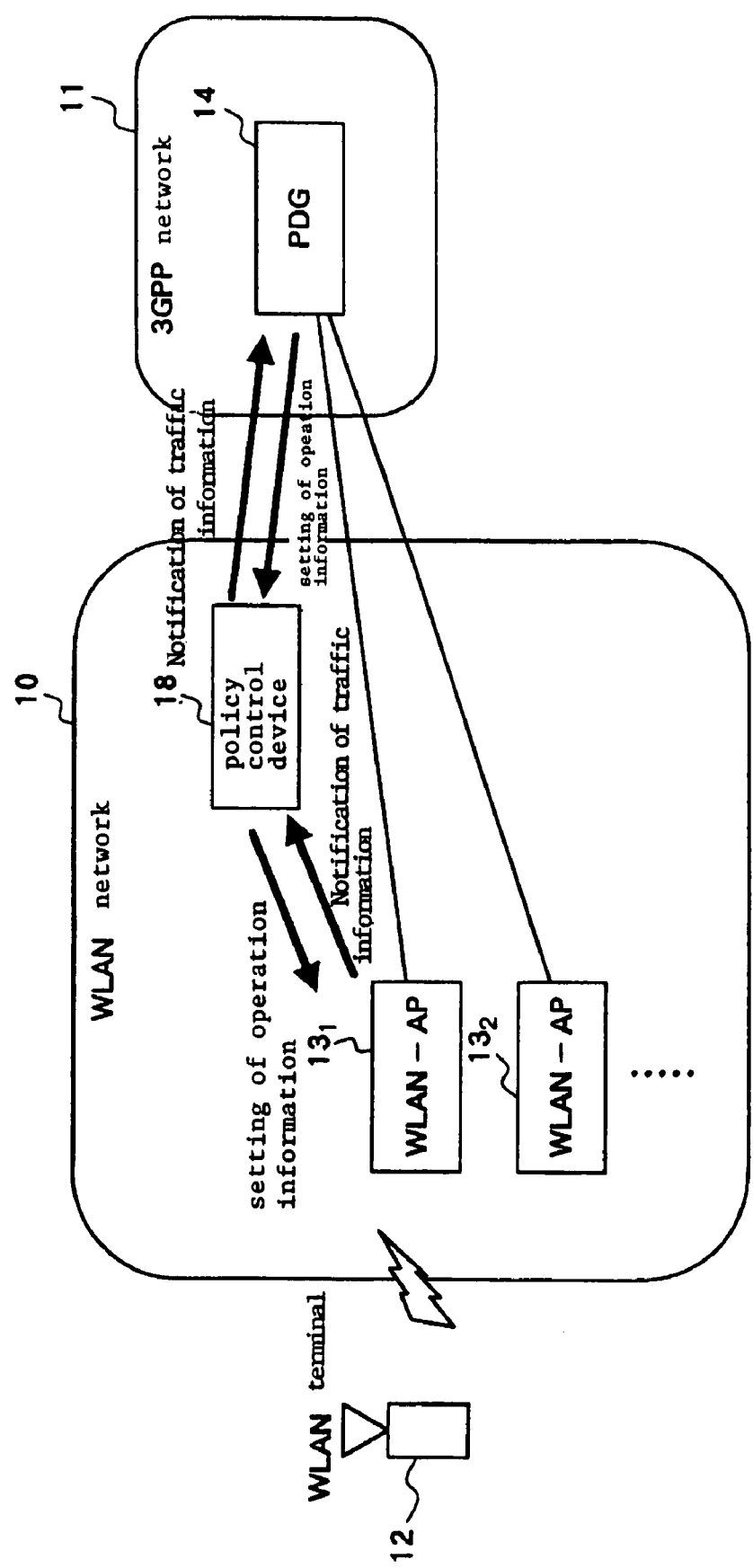
FIG. 15 is a block diagram showing the configuration of a communication system according to the third embodiment.

FIG. 15 is a block diagram showing the configuration of a communication system according to the third embodiment. Referring to FIG. 15, WLAN network 10 and 3GPP network 11 are interconnected in the communication system of the present embodiment, as in the first embodiment.

WLAN network 10 may include WLAN-AP $13_1$ and $13_2$ and policy control device 18, as in the second embodiment, and may further include communication devices (not shown) in wired sections.

Policy control device 16 of the second embodiment was a device for implementing centralized control of operation information in WLAN network 10. In the third embodiment, however, PDG 14 in 3GPP network 11 realizes centralized control of both WLAN network 10 and higher-layer networks that include 3GPP network 11.

Policy control device 18 in the third embodiment has the capability for collecting and reporting to PDG 14 traffic information from WLAN-AP $13_1$ and $13_2$, and for reporting to WLAN-AP $13_1$ and $13_2$ and communication devices of wired sections the parameter settings of operation information relating to the WLAN network that have been reported from PDG 14.

PDG 14 of the third embodiment implements centralized control of the access category mapping table of WLAN network 10. PDG 14 collects traffic information from WLAN-AP $13_1$ and $13_2$ by way of policy control device 18. PDG 14 further obtains the state of traffic in 3GPP network 11.

PDG 14 then dynamically varies the operations of QoS control and traffic control in WLAN network 10 based on the traffic information collected from WLAN-AP $13_1$ and $13_2$, the state of traffic in 3GPP network 11, and the access category mapping table over which it exercises centralized control. PDG 14 here instructs the parameter settings of QoS control and traffic control to WLAN-AP $13_1$ and $13_2$ and communication devices of wired sections by way of policy control device 18.

PDG 14 further determines the advisability of accepting new calls and determines the QoS values in QoS negotiation with WLAN terminals 12 through determinations based on the traffic information in the WLAN network and the traffic state in 3GPP network 11.

WLAN-AP $13_1$ and $13_2$ of the present embodiment reflect in their own access category mapping tables the QoS information reported from PDG 14 by way of policy control device 18 and implement QoS control based on this table.

WLAN-AP $13_1$ and $13_2$ and communication devices of wired sections of WLAN network 10 implement QoS control and traffic control in accordance with the parameter settings reported from PDG 14 by way of policy control device 18.

According to the present embodiment as described in the foregoing explanation, PDG 14 collects traffic information from WLAN-AP $13_1$ and $13_2$ and dynamically changes QoS control and traffic control in each device in WLAN network 10 based on this traffic information and the traffic state of the 3GPP network, whereby appropriate QoS control can be implemented in real time according to the state of traffic in the WLAN network and the 3GPP network. In addition, appropriate QoS control can be implemented for each higher-layer network.

Fourth Embodiment

Figure 16:
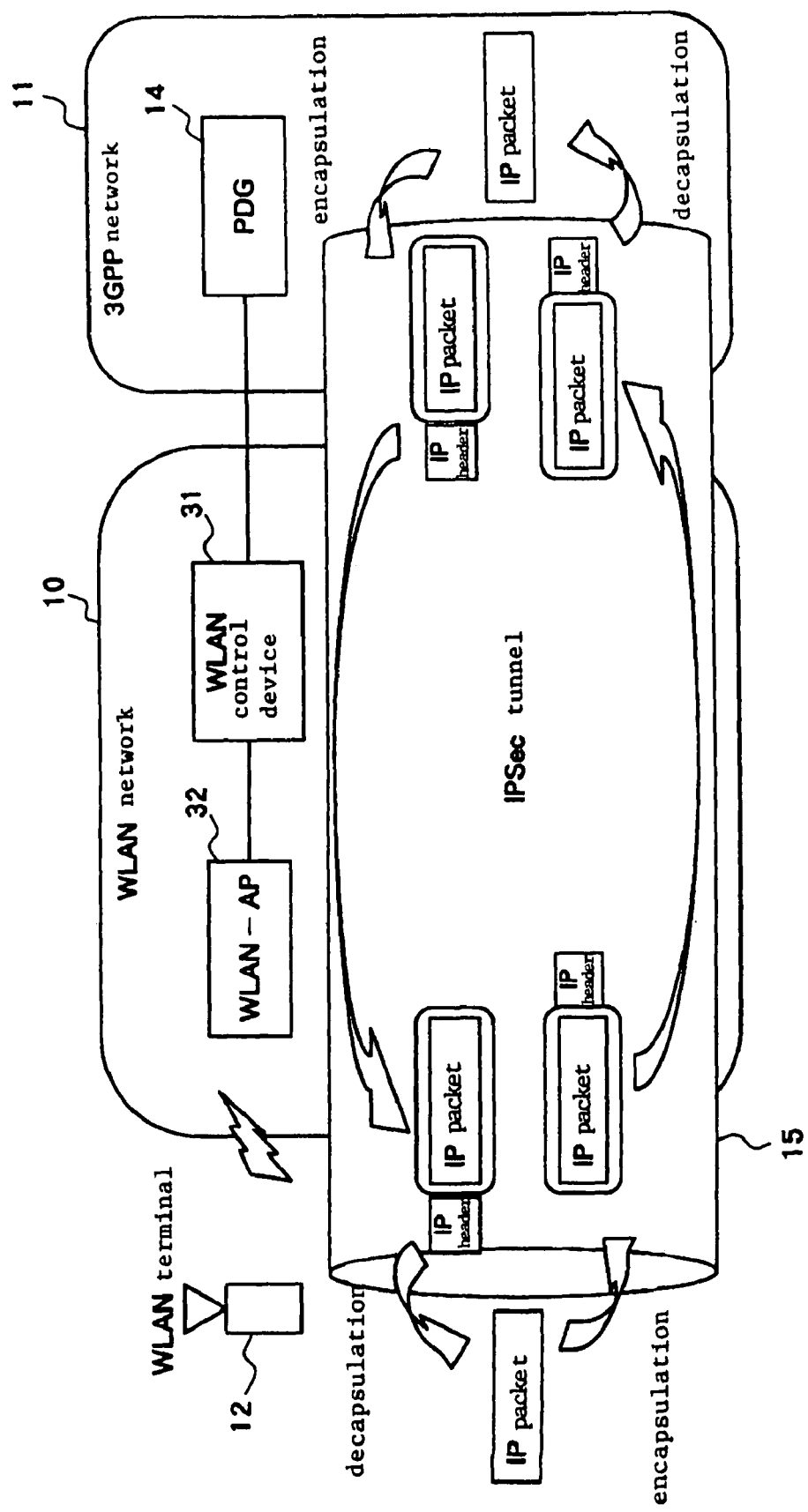
FIG. 16 is a block diagram showing the configuration of a communication system according to the fourth embodiment.

FIG. 16 is a block diagram showing the configuration of a communication system according to the fourth embodiment. Referring to FIG. 16, WLAN network 10 and 3GPP network 11 in the communication system of the present embodiment are interconnected. This WLAN network 10 and 3GPP network 11 are capable of interworking. This interworking enables the connection of WLAN terminals 12 to 3GPP network 11 by way of WLAN network 10. WLAN terminal 12, 3GPP network 11, and PDG 14 within this 3GPP network 11 are the same as in the first embodiment.

WLAN network 10 includes WLAN-AP (WLAN-Access Point) 32 that connects wirelessly to WLAN terminals 12 and WLAN control device 31, and may further include communication devices (not shown) such as routers in wired sections. Encapsulated IP packets transmitted from PDG 14 to WLAN terminals 12 pass by way of WLAN control device 31 between PDG 14 and WLAN-AP 32.

Figures 17, 18:
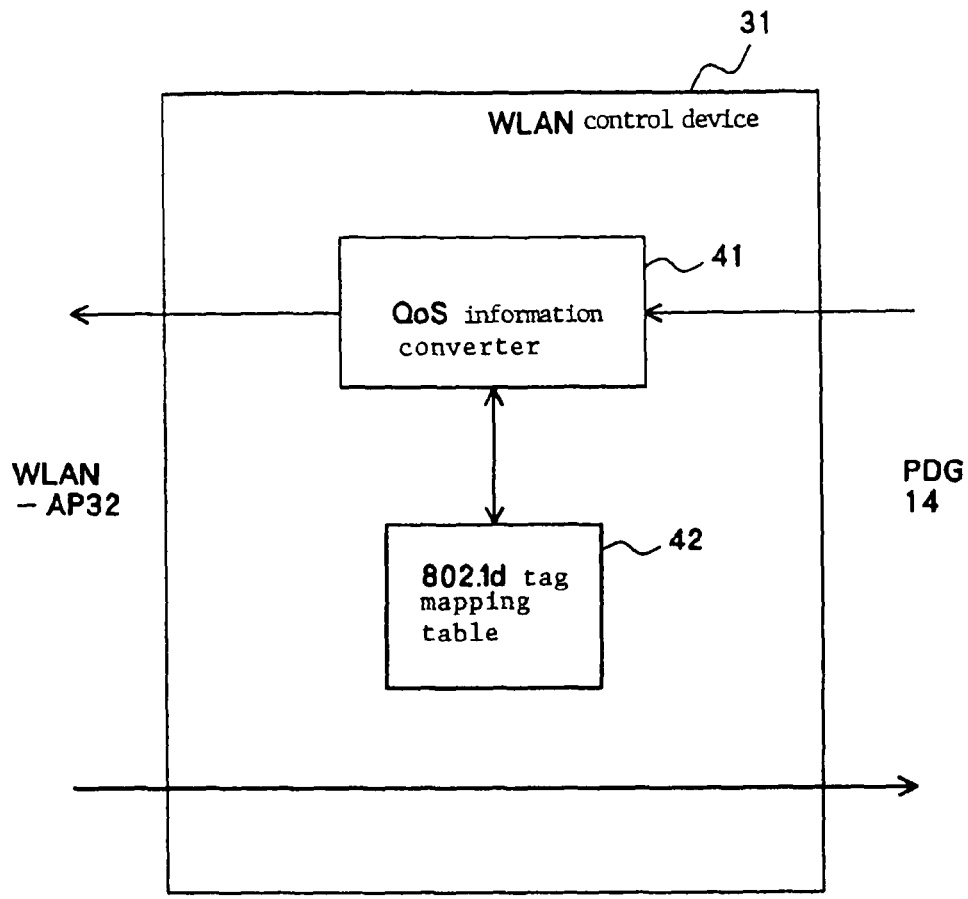
FIG. 17 is a block diagram showing the configuration of a WLAN control device.
FIG. 18 shows an example of an 802.1d tag mapping table.

FIG. 17 is a block diagram showing the configuration of a WLAN control device. Referring to FIG. 17, WLAN control device 31 includes QoS information converter 41 and 802.1d tag mapping table 42.

802.1d tag mapping table 42 records the correspondence between DSCP values, which are the QoS information that is conferred to headers of encapsulated IP packets, and 802.1d tags used in priority control in the Ethernet. FIG. 18 shows an example of an 802.1d tag mapping table. Referring to FIG. 18, the correspondence between DSCP values and 802.1d tags is shown.

QoS information converter 41, upon receiving encapsulated IP packets in the downlink direction from PDG 14, acquires the DSCP direction in the IP headers of these IP packets, and refers to 802.1d tag mapping table 42 to find 802.1d tags. QoS information converter 41 then confers the 802.1d tags that have been found and transmits the IP packets to WLAN-AP 32.

Figures 19, 20:
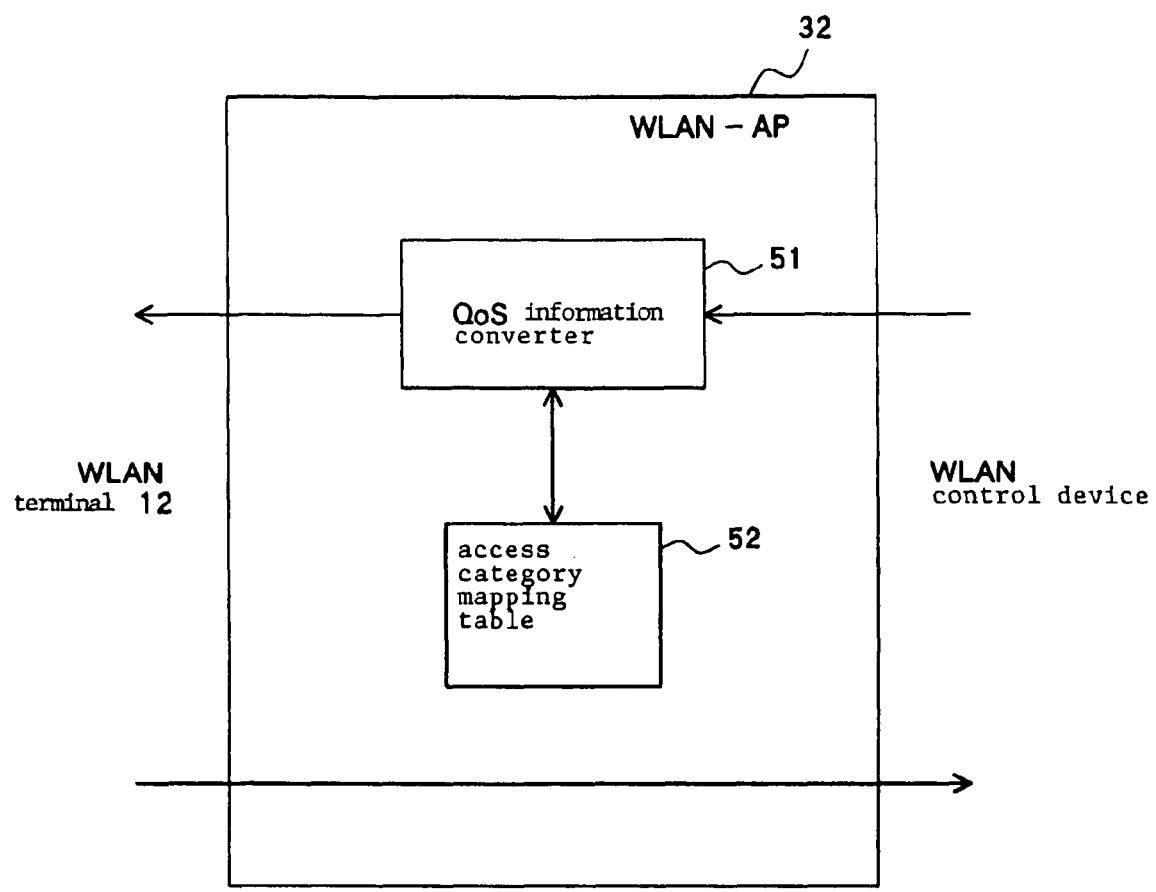
FIG. 19 is a block diagram showing the configuration of WLAN-AP according to the fourth embodiment.
FIG. 20 shows an access category mapping table in the fourth embodiment.

FIG. 19 is a block diagram showing the configuration of WLAN-AP according to the fourth embodiment. Referring to FIG. 19, WLAN-AP 32 includes QoS information converter 51 and access category mapping table 52.

Access category mapping table 52 records the correspondence between 802.1d tags and WLAN access categories, which are the QoS information of wireless sections of WLAN network 10. FIG. 20 shows an access category mapping table in the fourth embodiment. Referring to FIG. 20, the correspondence between 802.1d tags and WLAN access categories is shown.

QoS information converter 51, upon receiving encapsulated packets in the downlink direction from WLAN control device 31, acquires the 802.1d tags and then refers to the access category mapping table to find the WLAN access categories, which are the QoS information of wireless sections. QoS information converter 51 next uses the WLAN access categories that have been found to wirelessly transmit the IP packets to WLAN terminals 12.

The access category mapping table shown in FIG. 20 is the table disclosed as Table A1 in 3GPP TR23.836 v.1.0.0. In other words, WLAN-AP 32 carries out the operations prescribed by 3GPP TR23.836 v.1.0.0.

According to the present embodiment as described in the foregoing explanation, WLAN terminals 12 and PDG 14 in 3GPP network 11 transmit and receive IP packets to each other, these IP packets having been encapsulated after converting 3GPP traffic classes, which have been determined in QoS negotiation, to DSCP values. WLAN control device 31, upon receiving downlink IP packets directed from PDG 14 to WLAN terminal 12, acquires the DSCP values from the headers of these packets, and then transmits to WLAN-AP 32 packets to which 802.1d tags corresponding to these DSCP values have been conferred. WLAN-AP 32, upon receiving the packets from WLAN control device 31, converts the 802.1d tags that have been conferred to these packets to WLAN access categories and then wirelessly transmits the IP packets to WLAN terminals 12. By placing the QoS control of the 3GPP network in association with the QoS control of the WLAN network in this way, appropriate QoS control can be realized in wireless sections of the WLAN network. In addition, WLAN-AP 32 of the present embodiment performs only operations prescribed in 3GPP TR23.836 v.1.0.0, and WLAN-AP of the present embodiment therefore offers versatility and compatibility.

In the present embodiment, moreover, operation information is subject to centralized control as in the second or third embodiment, and QoS control can further be changed dynamically. In such cases, the policy control device described in the second or third embodiment may be added to the communication system of the present embodiment. Alternatively, the functions of the policy control device of the second or third embodiment may also be added to WLAN control device 31 of the present embodiment.

FIG. 18 showed an example of the 802.1d tag mapping table used in WLAN control device 31, but a policy control device may effect dynamic control over the settings of this 802.1d tag mapping table. In such cases, the policy control device may control the 802.1d tag mapping table based on traffic information that is obtained from WLAN-AP 32.

FIG. 21 shows an example of the control over the 802.1d tag mapping table by means of a policy control device when a policy control device has been added to the fourth embodiment. If the higher-layer network is limited to a network realized by a single operator (for example, a 3GPP network), competition for resources among higher-layer networks need not be taken into account in the QoS control by means of the 802.1d tag mapping table.

For example, the policy control device may use the 802.1d tag mapping table shown in FIG. 16 as a default and then control the 802.1d tag mapping table based on traffic information that has been acquired from WLAN-AP 32. Upon determining, based on traffic information, that the assignment of adequate wireless bandwidth to VOICE and VIDEO is problematic, the policy control device may limit the QoS demand for VOICE and VIDEO from the higher-layer network.

When limiting the QoS demand of VOICE and VIDEO, the policy control device may rewrite the 802.1d tag mapping table as shown in FIG. 21, whereby VOICE and VIDEO are limited to the same priority as Best Effort.

FIG. 22A and FIG. 22B show other examples of the control over 802.1d tag mapping table by a policy control device when a policy control device is added to the fourth embodiment. When there is a plurality of higher-layer networks that are realized by different operators, competition for resources among the higher-layer networks can be taken into account in QoS control by means of the 802.1d tag mapping table.

For example, a configuration may be adopted that enables different 802.1d tag mapping table settings for each higher-layer network wherein the policy control device controls each 802.1d tag mapping table based on traffic information acquired from WLAN-AP 32. For example, an 802.1d tag mapping table for a 3GPP network may be set as in FIG. 22A, and an 802.1d tag mapping table for an ISP network may be set as in FIG. 22B.

While preferred embodiments of the present invention have been described using specific terms, such description is for illustrative purposes only, and it is to be understood that changes and variations may be made without departing from the spirit or scope of the following claims.

What is claimed is:

1. A wireless local area network access point device that is the access point of a wireless local area network that interworks with a mobile communication network, comprising:
   a mapping table for holding the correspondence relation between quality of service information of wired sections and quality of service information of wireless sections; and
   a quality of service information converter, for, upon receiving encapsulated packets directed from said mobile communication network to a wireless local area network terminal, acquiring said quality of service information of wired sections that has been conferred to these packets, acquiring the quality of service information of wireless sections that corresponds to this quality of service information of wired sections from said mapping table, and using this quality of service information of wireless sections to wirelessly transmit said encapsulated packets to said wireless local area network terminal.

2. A wireless local area network access point device according to claim 1, wherein said quality of service information of wired sections is Diffserv Code Point values that are used in Diffserve, and said quality of service information of wireless sections is wireless local area network access categories.

3. A wireless local area network system comprising:
   a wireless local area network access point device according to claim 2; and
   a first control device arranged between said mobile communication network and said wireless local area network access point for receiving downlink packets from said mobile communication network, finding 802.1d tags that correspond to DiffServ Code Point values that have been conferred to these downlink packets in the mobile communication network, and adding these 802.1d tags to the downlink packets;
   wherein said wireless local area network access point device: receives, from said first control device, said downlink packets to which said 802.1d tag have been conferred; finds wireless local area network access categories that correspond to the 802.1d tags; and uses the wireless local area network access categories to transmit said downlink packets to said wireless local area network terminal.

4. A wireless local area network system according to claim 3, further comprising:
   a second control device for: collecting traffic information from said wireless local area network access point device, determining operation information based on the traffic information, and reporting the operation information to said wireless local area network access point device;
   wherein said wireless local area network access point device reports the traffic information of its own device to said second control device, receives the operation information determined by said second control device from said second control device, and uses the operation information in quality of service control.

5. A wireless local area network system according to claim 4, wherein said second control device realizes dynamic control over said mapping table of said wireless local area network access point device by continuously determining said mapping table that is used in said wireless local area network access point device based on said traffic information and transmitting said mapping table as said operation information to said wireless local area network access point device.

6. A wireless local area network system according to claim 3, further comprising:
    a third control device for collecting traffic information from said wireless local area network access point device, reporting said traffic information to said mobile communication network, and receiving from said mobile communication network operation information that has been determined based on said traffic information in said mobile communication network and reporting said operation information to said wireless local area network access point device;
    wherein said wireless local area network access point device reports the traffic information of its own device to said mobile communication network by way of said third control device, receives operation information that has been determined in said mobile communication network from said mobile communication network by way of said third control device, and uses said operation information in quality of service control.

7. A wireless local area network control device for controlling a wireless local area network access point device of a wireless local area network that interworks with a mobile communication network; comprising:
    a mapping table for holding the correspondence relation between Diffserv code point values used in Diffserv and 802.1d tags; and
    a quality of service information converter for receiving downlink packets from said mobile communication network, acquiring Diffserv code point values that have been conferred to said downlink packets in said mobile communication network, finding 802.1d tags that correspond to said Diffserv Code Point" values from said mapping table and adding these 802.1d tags to said downlink packets, and sending said downlink packets to said wireless local area network access point device.

8. A communication system that allows interworking of a wireless local area network and a mobile communication network, comprising:
    a packet data gateway device that belongs to said mobile communication network for, after a tunnel is established with a wireless local area network terminal by way of said wireless local area network, determining quality of service information of wired sections by means of negotiation with said wireless local area network terminal, and when transmitting encapsulated packets by said tunnel, adding to said packets quality of service information of said wired sections; and
    a wireless local area network access point device that belongs to said wireless local area network for, upon receiving encapsulated packets directed to said wireless local area network terminal from said packet data gateway device, finding quality of service information of wireless sections that correspond to said quality of service information of wired sections that has been conferred to said packets and using said quality of service information of wireless sections to wirelessly transmit said encapsulated packets to said wireless local area network terminal.

9. A communication system according to claim 8, wherein said quality of service information of wired sections is Diffserv code point values used in Diffserv, and said quality of service information of wireless sections is wireless local area network access categories.

10. A communication system according to claim 9, wherein said wireless local area network access point device receive from said packet data gateway device said downlink packets to which said DSCP Code Point values have been conferred, finds wireless local area network access categories that correspond to said DiffServ Code Point values, and uses the access categories to transmit said downlink packets to said wireless local area network terminal.

11. A communication system according to claim 9, further comprising:
    first control device arranged between said packet data gateway device and said wireless local area network access point device for receiving downlink packets from said packet data gateway device, finding 802.1d tags that correspond to DiffServ Code Point values that have been conferred to the downlink packets by said packet data gateway device, and adding said 802.1d tags to the downlink packets;
    wherein said wireless local area network access point device receives from said first control device said downlink packets to which said 802.1d tags have been conferred, finds wireless local area network access categories that correspond to said 802.1d tags, and uses the wireless local area network access categories to transmit said downlink packets to said wireless local area network terminal.

12. A communication system according to claim 8, further comprising:
    a second control device for collecting traffic information from said wireless local area network access point device, determining operation information based on the traffic information, and reporting the operation information to said wireless local area network access point device;
    wherein said wireless local area network access point device reports traffic information of its own device to said second control device, receives operation information that has been determined in said second control device from said second control device, and uses the operation information in quality of service control.

13. A communication system according to claim 12, wherein said second control device dynamically controls said mapping table of said wireless local area network access point device by continuously determining said mapping table that is used in said wireless local area network access point device based on said traffic information and transmitting the mapping table as said operation information to said wireless local area network access point device.

14. A communication system according to claim 8, further comprising:
    a third control device for collecting traffic information from said wireless local area network access point device, reporting the traffic information to said packet data gateway device, and receiving from said packet data gateway device operation information that has been determined in said packet data gateway device to report this operation information to said wireless local area network access point device;

wherein said packet data gateway device receives said traffic information from said third control device and determines said operation information based on the traffic information to report this operation information to said third control device; and said wireless local area network access point device reports the traffic information of its own device to said packet data gateway device by way of said third control device, receives operation information that has been determined in said packet data gateway device from said packet data gateway device by way of said third control device, and uses the operation information in quality of service control.

15. A communication system according to claim 14, wherein said packet data gateway device dynamically controls said mapping table of said wireless local area network access point device by, based on said traffic information, continuously determining said mapping table used in said wireless local area network access point device and transmitting the mapping table as said operation information to said wireless local area network access point device by way of said third control device.

16. A data communication method for allowing interworking of a wireless local area network and a 3GPP mobile communication network, said data communication method comprising:

quality of service negotiation is carried out in a wireless local area network terminal and a packet data gateway device of said 3GPP mobile communication network to determine 3GPP traffic classes;

said packet data gateway device adds Diffserv Code Point values used in Diffserv that correspond to said 3GPP traffic classes to headers to transmit encapsulated downlink packets; and a wireless local area network access point device that has received said downlink packets from said packet data gateway device finds wireless local area network access categories that correspond to said Diffserv Code Point values that have been added to said downlink packets and uses the wireless local area network access categories to wirelessly transmit said downlink packets to said wireless local area network terminal.

* * * * *